Oct. 14, 1930.     S. HERBERT     1,778,636
PICTURE SUPPORT
Filed June 11, 1929
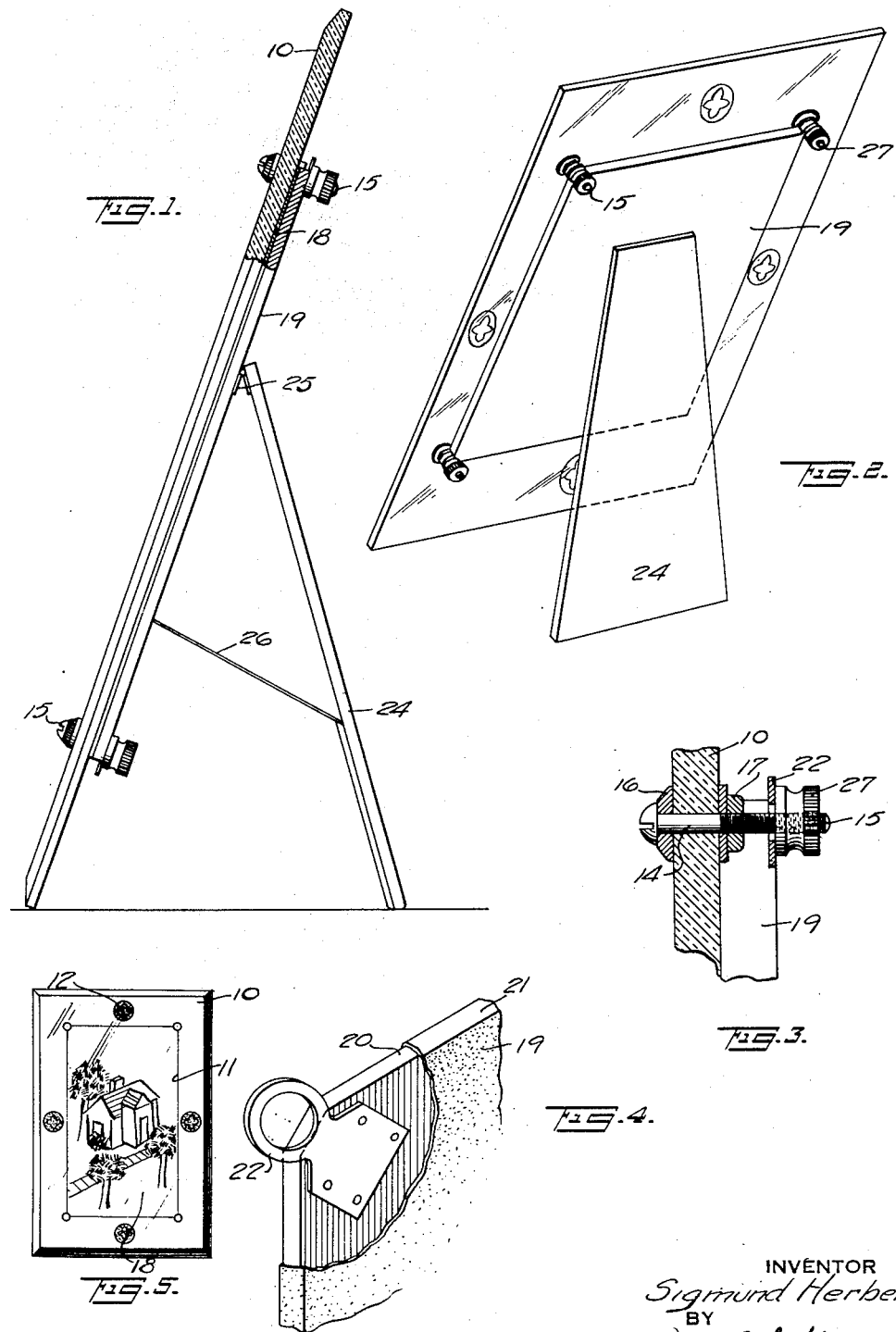

Patented Oct. 14, 1930

1,778,636

UNITED STATES PATENT OFFICE

SIGMUND HERBERT, OF NEW YORK, N. Y.

PICTURE SUPPORT

Application filed June 11, 1929. Serial No. 369,988.

The present invention relates to picture supports or frames and is more particularly directed toward a form of picture support or frame employing a glass panel to which is secured a backplate adapted to hold a picture in place next the panel.

The present invention contemplates a frame or support of the above type, wherein the front plate consists of a simple piece of glass of the desired shape, with or without ornamentation, and wherein the picture is held in place by a backplate clamped against the rear surface of the glass. This backplate supports a brace or easel so that the complete device may be used in the ordinary manner for displaying the picture.

The accompanying drawings show, for purposes of illustrating the present invention, one of the many possible embodiments in which the invention may take form, it being understood that the drawings are illustrative of the invention rather than limiting the same.

In the drawing:

Figure 1 is a side elevational view with parts in section;

Figure 2 is a perspective view of the picture support taken from the rear;

Figure 3 is an enlarged sectional view through the bolt employed for securing the back in place;

Figure 4 is a perspective view showing a detail of construction of the backplate; and Figure 5 is a front view of the picture frame.

As above indicated the picture frames contemplated herein employ a front glass panel. This panel is here shown at 10 and may be rectangular or of any desired size and configuration. It is provided with a central transparent panel 11 behind which the picture is displayed. The margins of the glass plate may have ornaments such as indicated at 12 cut into the glass, and if desired, these ornaments may be mirrored. The entire margin may be mirrored or may be transparent except for the mirrored ornaments. These may be varied according to the fancy of the designer.

The glass plate 10 is provided as here shown with four holes 14 to accommodate bolts 15. These bolts pass through the glass and may be provided with an ornamental washer 16 in the front and if desired may be held in place on the glass by lock nuts 17. The picture indicated at 18 is held in place by backplate 19. This backplate is in the form here shown, rectangular in shape and consists of a heavy stiff sheet of cardboard 20 and a cloth covering 21, such as velvet or the like. The corners of the cardboard carry sheet metal rings 22 secured to the cardboard by pins indicated at 23. These rings project outwardly and are arranged to fit the bolts 15.

The backplate 19 also carries a brace or easel 24 made of cardboard and covered with fabric in the same manner as the backplate 19. This brace or easel is hingedly supported at 25 and is connected to the backplate by a ribbon or the like 26.

The picture support or frame contemplated herein presents a pleasing appearance and the picture is at all times held against the glass. The glass plate may be ornamented or not as desired.

When one desires to place a picture or photograph in place in the frame, the thumb nuts 27 are taken off the screws 15, the back plate removed, the picture inserted, the backplate placed in place, and the nuts tightened as will be obvious.

Certain features disclosed herein are claimed in my co-pending application Serial No. 369,987, filed June 11, 1929.

It is obvious that the invention may be embodied in many forms and constructions within the scope of the claims, and I wish it to be understood that the particular form shown is but one of the many forms. Various modifications and changes being possible, I do not otherwise limit myself in any way with respect thereto.

I claim:

1. A picture support comprising a front glass plate having a central transparent panel through which to view a picture, a plurality of bolts passed through the glass outside the panel, a back of approximately the size of the panel, the back carrying rings to receive the bolts, and nuts threaded on the bolts for securing the back against the glass to hold an interposed picture in place.

2. A picture support comprising a front glass plate having a central transparent panel through which to view a picture, a plurality of bolts passed through the glass outside the panel, a back of approximately the size of the panel, the back carrying rings to receive the bolts, nuts threaded on the bolts for securing the back against the glass to hold an interposed picture in place, and a brace hinged to the back for holding the device in an inclined position.

Signed at New York city, in the county of New York and State of New York, this 10th day of June, 1929.

SIGMUND HERBERT.